United States Patent [19]

Kenny

[11] 4,417,599

[45] Nov. 29, 1983

[54] VACUUM SIGNAL INTEGRATOR

[75] Inventor: Andrew A. Kenny, Roselle, Ill.

[73] Assignee: Eaton Corporation, Cleveland, Ohio

[21] Appl. No.: 289,545

[22] Filed: Aug. 3, 1981

[51] Int. Cl.³ .............................................. G05D 16/00

[52] U.S. Cl. .......................................... 137/85; 137/86

[58] Field of Search ......................... 137/86, 85, 82, 84

[56] References Cited

U.S. PATENT DOCUMENTS

| | | | |
|---|---|---|---|
| 2,505,981 | 5/1950 | McLeod | 137/86 X |
| 2,677,385 | 5/1954 | Markson | 137/85 |
| 2,898,929 | 8/1959 | Williams | 137/85 |
| 3,529,802 | 9/1970 | Hall | 137/86 X |

*Primary Examiner*—Alan Cohan

*Attorney, Agent, or Firm*—C. H. Grace; R. A. Johnston

[57] ABSTRACT

A Vacuum Signal Integrator (10) is typically employed for processing and combining multiple vacuum input signals into a single output signal within the environment of a truck or automobile. The integrator, in a typical application, would input vacuum signals representative of throttle position, RPM, altitude and coolant temperature and output a vacuum signal equivalent to the algebraic sum thereof to modulate a diesel EGR valve. Structurally, the integrator includes a housing (11) carrying several conventional vacuum motors (32, 34 and 36). Each vacuum motor applies a force to an idler bar (68) within the housing through reaction inserts (62, 94 and 96), which is representative of a monitored input signal. The individual forces collectively applied to the idler bar generate a resultant or moment force thereon which is linked to a conventional vacuum modulator valve (38) through a vent insert (118).

The housing is formed in an upper and lower section which are hinged about pin 24 and latched by snap-locks 18, 20 to close. The idler bar and modulator bar are mounted in the lower shell and certain of the vacuum motors are mounted on the upper shell.

13 Claims, 8 Drawing Figures

VACUUM SIGNAL INTEGRATOR

INTRODUCTION

The present invention relates to methods and apparatus for integrating a plurality of force inputs into a signal moment or force output in the controlling of associated devices. More particularly, the invention relates to such methods and apparatus in which a plurality of pneumatic signals are received and integrated mechanically to produce a pneumatic output signal equivalent to the algebraic sum of the inputs.

CROSS REFERENCE

The subject matter of this application is related, in certain aspects, to that of U.S. Pat. No. 3,770,195; U.S. application Ser. No. 088,806, filed Oct. 29, 1979; and U.S. application Ser. No. 146,903, filed May 4, 1980.

BACKGROUND OF THE INVENTION

Vacuum has traditionally been a primary motive force for many control functions within motor vehicles, particularly automobiles. Although electro-mechanical actuators have displaced vacuum motors for certain functions, vacuum remains the preferred method of modulating such automotive operating parameters as ignition timing, emissions control, throttle (cruise control) position and the like.

Ever increasing complexity required to conform with governmental regulations and added vehicle features has necessitated the addition of intelligence to certain control functions. Prior Art processing of vacuum signals however, typically has been limited to dedicated, signal function devices, such as a vacuum motor for modulating and exhaust gas recirculation (EGR) valve. Where intelligence or complex processing was required, discrete separate components were generally coupled or cascaded to achieve the required processing capability.

The competitive nature of the automobile industry however, typically makes the coupling of two or more established components to perform a single new function, cost prohibitive. For this reason, existing vacuum devices often prove unacceptable for new applications, especially where complex processing is required. The application of electronic processors has ameliorated the situation somewhat but has introduced additional shortcomings. Electromechanical actuators are heavy and expensive, and are often unsuitable for low-force functions. Additionally, electronic processors require pneumatic and/or mechanical-electrical transducers which add more expense. Also, the use of custom design electronics and electro-mechanical devices can be cost ineffective in applications where design changes are frequently made.

BRIEF DESCRIPTION OF THE INVENTION

The present invention finds particular application in providing control functions in the environment of a motor vehicle. According to the invention, and by way of overcoming the above described shortcomings of prior art approaches, the device for integrating a number of fluid pressure input signals comprises a like number of pressure responsive members such as vacuum motors, each associated with one of the input signals, to generate a mechanical force responsive thereto which is simultaneously translated with the other input mechanical forces into a single resultant force equivalent to the algebraic sum of the fluid pressure input signals which drives a modulator valve operative to generate a fluid pressure output signal in response thereto.

In the present invention a vacuum signal integrator is disclosed which includes a housing defining a cavity therewithin and a plurality of fluid ports each in fluid communication with conventional vacuum motors. The vacuum motors include a flexible diaphragm in fluid communication on one side thereof with a fluid pressure condition in the corresponding fluid port, and on the other side thereof with the cavity defined by the housing. The housing cavity is maintained at atmospheric pressure.

A crank or idler bar is rotatably connected within the housing cavity and includes bosses, offset from the idler bar axis of rotation. Reaction inserts are pivotally mounted between the bosses and one side of an associated flexible diaphragm. Movement of each of the vacuum motor diaphragms results in individual forces being applied through the associated reaction insert to the idler bar thereby generating a resultant force or moment input on the idler bar. The resultant idler bar moment is then transferred to an insert member of a conventional vacuum modulator valve, the movement thereof resulting in a predetermined output vacuum signal from the modulator valve. The number of vacuum motor outputs having an input to the idler bar can be varied to suit the particular application, however, the resultant effect, namely an integrated resultant force or moment on the idler bar will be achieved.

It is therefore an object of the invention to provide a device which integrates a plurality of pneumatic inputs into a resultant force output which is available for controlling a vacuum modulator valve.

Various other features and advantages of this invention will become apparent upon reading the following detailed description of the invention, which, along with the drawings, describes and discloses a preferred embodiment of the invention. A detailed description of the disclosed embodiment makes reference to the accompanying drawings.

BRIEF DESCRIPTION OF THE DRAWINGS

FIG. 3 is a section view taken along lines 3—3 of FIG. 1 on an enlarged scale;

DETAILED DESCRIPTION OF THE PREFERRED EMBODIMENT OF THE INVENTION

Figure 1:
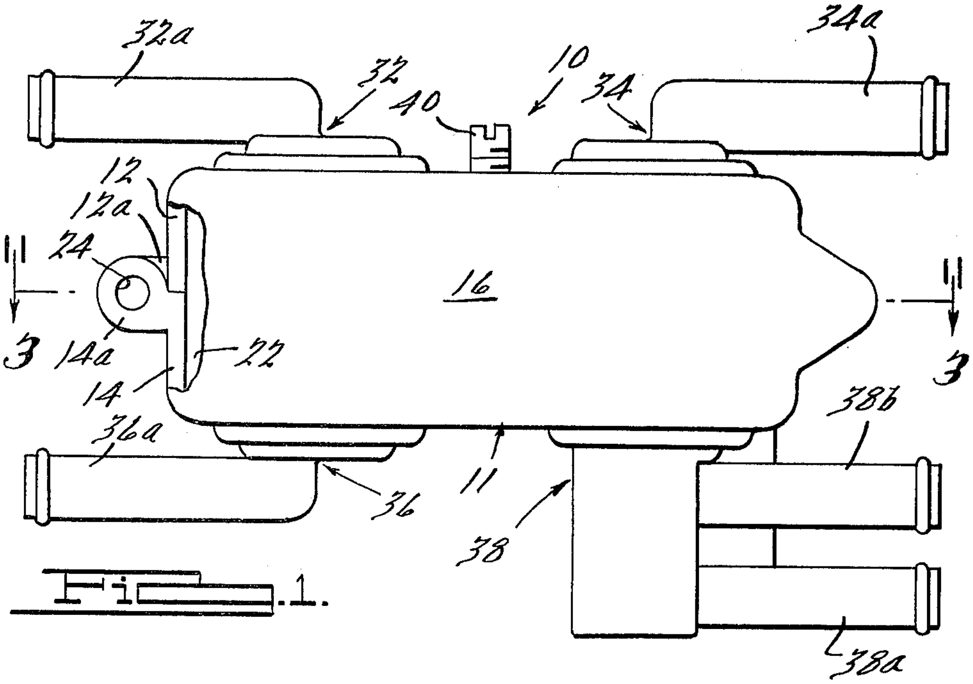
FIG. 1 is a broken front elevation view of a vacuum signal integrator embodying the principles of the invention.
Figure 2:
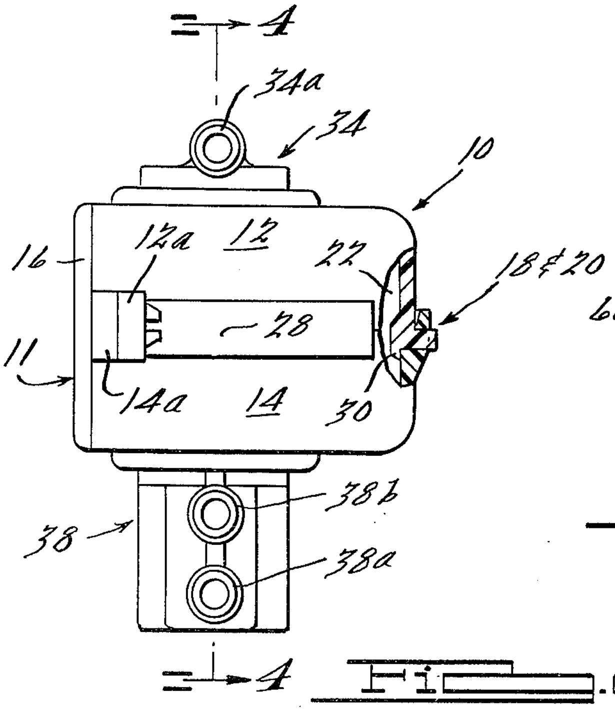
FIG. 2 is a broken right side view releative to FIG. 1.

Referring to FIGS. 1 and 2, the external details of the preferred embodiment of a vacuum signal integrator (VSI) 10 are illustrated. VSI 10 is intended for inclusion in a system which controls a diesel EGR valve. However, the present invention has broader application, it being understood that the detailed description is for illustrative purposes only and not to be construed as limiting.

In the preferred illustrative application, VSI 10 is adapted to receive input signals from a number of intelligent vacuum sources such as an altitude compensated regulator, throttle position regulator, RPM bias regulator, coolant temperature bias regulator and the like. The devices which originate these vacuum signals are intended to be of conventional design, the details of which are deleted here for sake of brevity. Additionally, the devices making up a particular complement of inputs to VSI 10 will vary depending upon the precise application intended, the above listed devices being by way of example only.

VSI 10 operates generally by receiving a number of independently generated intelligence containing vacuum signals, and generating a single output vacuum signal equivalent to the algebraic sum of the inputs. It is contemplated that two or more inputs could be employed depending upon the intended application. Additionally, more than one output could also be employed if so desired.

As illustrated in FIGS. 1 and 2, VSI 10 has a generally retangular body 11 composed of upper and lower body portions 12 and 14, respectively, and a cover plate 16. Body portions 12 and 14 are interconnected at the rearward most extent (as best viewed in FIGS. 2 and 3) of body 11 by complementary tab and slot structures 18 and 20. Body portions 12 and 14 define a forwardly opening cavity 22 which is closed by cover plate 16. Upper and lower body portions 12 and 14 have laterally outwardly extending integrally formed ears 12*a* and 14*a*, respectively, which coact to define a pin receiving bore 24. Rearwardly projecting bifurcated pins 26 are integrally formed with cover plate 16 and, in assembly, extend through bores 24 to secure body portions 12 and 14 in their illustrated position. Pins 26 have areas of increased diameter 26*a* at their rearward most extent to provide "snap-action" retainment of body 11 in its fully assembled configuration. Guide ribs 28 and 30 are integrally formed with body portions 14 and 12, respectively, to add additional structural integrity to body 11.

Body portions 12 and 14 and cover plate 16 are illustrated as being formed from injection molded thermal plastic. However, it is contemplated that other suitable materials could be substituted. Additionally, body 11 is illustrated as being snapped together and capable of being disassembled without the use of specialized tools. Inasmuch as cavity 22 is maintained at substantially at atmospheric pressure, the present arrangement has been found as being satisfactory. However, if for some reason it were desireable to pressurize cavity 22 to something other than atmospheric pressure, it is conceivable that the constituant components of body 11 could be ultrasonically welded, glued or otherwise sealing assembled with one another.

Two conventional vacuum motors shown generally at 32 and 34 are integrally formed in upper body portion 12. A single vacuum motor shown generally at 36 as well as a conventional vacuum modulator valve shown generally at 38 are integrally formed in lower body portion 14. Vacuum motors 32, 34 and 36 each have a single laterally outwardly extending nipple portion 32*a*, 34*a* and 36*a*, respectively adapted for fluid connection with sources of fluid pressure (vacuum) signals such as an altitude compensation regulator, throttle position regulator, RPM bias regulator, coolant temperature bias regulator and the like (not illustrated). Likewise, vacuum modulator valve 38 has two laterally outwardly extending nipple portions 38*b* and 38*a* adapted for fluid interconnection with a stable vacuum source and an output device such as a diesel EGR valve, respectively. Finally, an externally accessible calibration screw 40, the function of which will be described in detail hereinbelow, is threadably engaged within a mating aperture 42 within upper body portion 12.

Figure 3A:
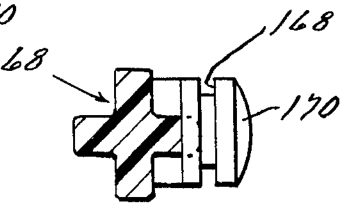
FIG. 3*a* is a section view taken along lines 3*a*—3*a* of FIG. 3.
Figure 2:
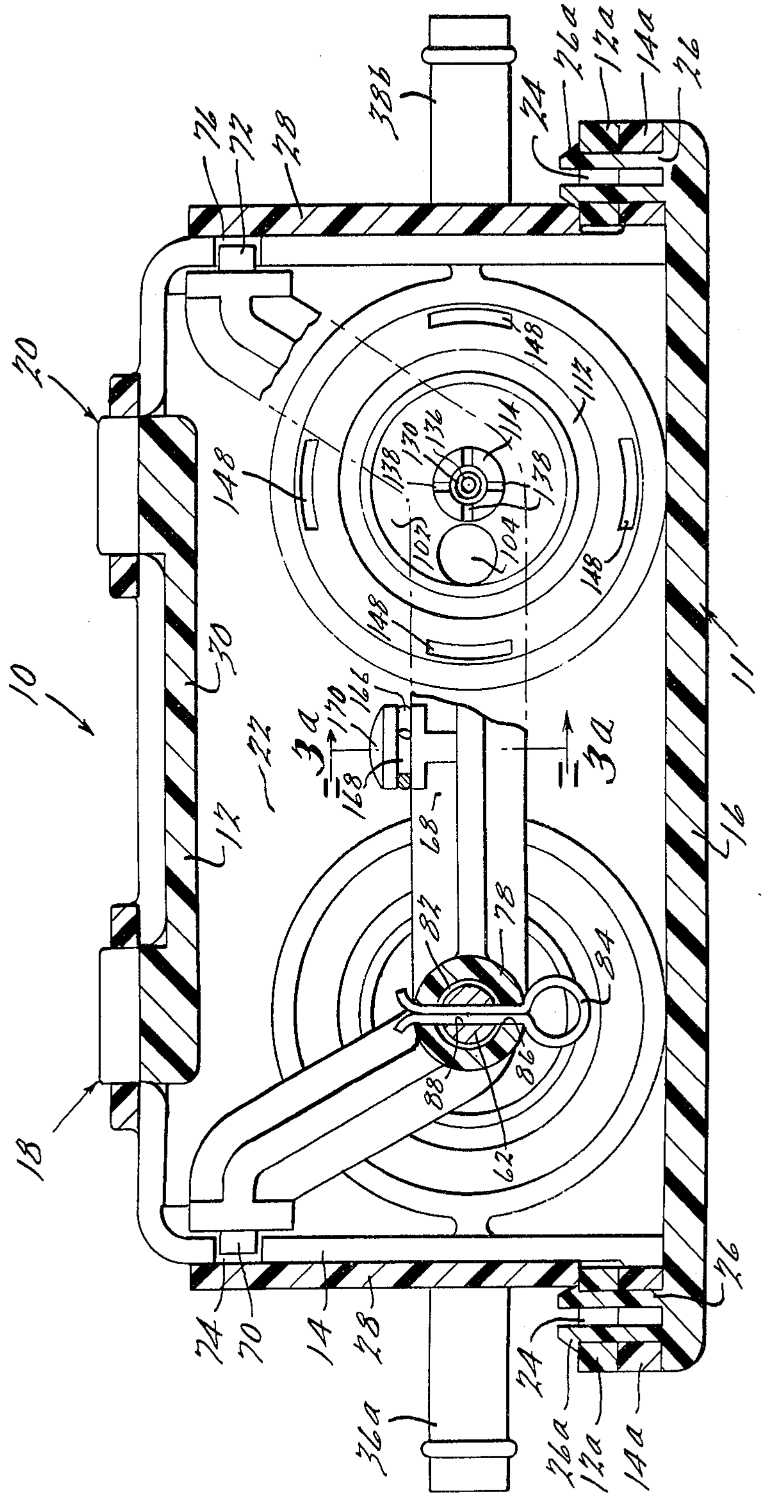
Figure 4:
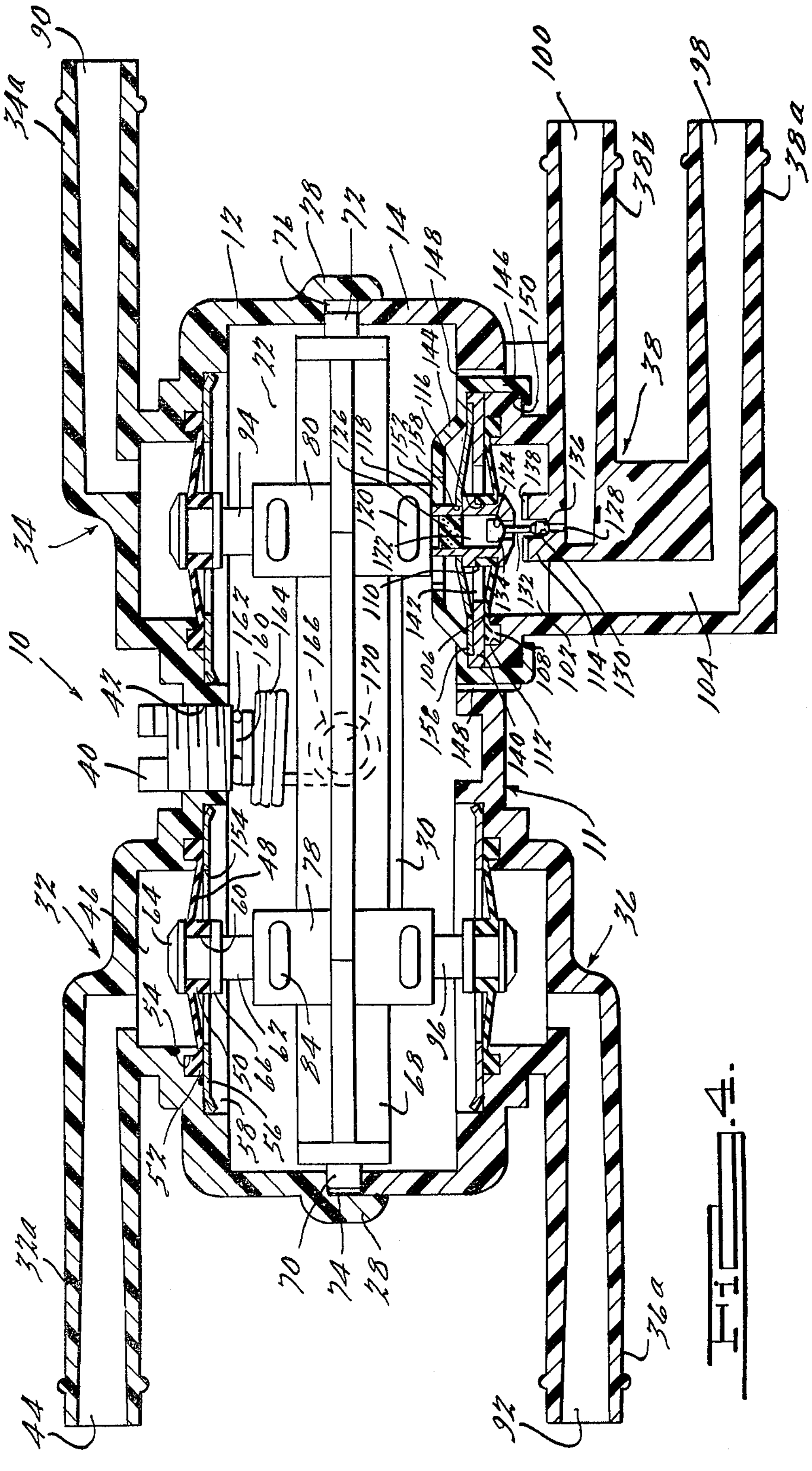
FIG. 4 is a section view taken along lines 4—4 of FIG. 2 on an enlarged scale; and, FIGS. 5*a*–5*c* are graphs of typical operating characteristics representing integrator regulator output versus vacuum signal input.

Referring to FIGS. 3 and 4, the internal details of VSI 10 are illustrated. Each of the three vacuum motors 32, 34 and 36 are substantially structurally identical and thus, for the sake of brevity, the details of only one will be elaborated upon here. Nipple 32*a* defines a first inlet port 44 which opens into a cavity 46 integrally formed in upper body portion 12 of VSI 10. Cavity 46 is closed by an annular flexible rubber diaphragm 48 having (radially) inner and outer beads 50 and 52, respectively. Bead 52 nests within a complementarily shaped annular diaphragm receiving slot 54 integrally formed in upper body portion 12 circumferentially about cavity 46. Bead 52 forms a substantially airtight seal at its interface with upper body portion 12 and is secured in its illustrated position by an annular retaining clip 56 which is pressed within a clip receiving recess 58 also integrally formed within upper body portion 12.

Bead 50 annularly defines an aperture 60 through which sealingly extends a reaction insert 62. Insert 62 has first and second areas of increased diameter 64 and 66 which embrace bead 50 of diaphragm 48 and prevent displacement of reaction insert 62 with respect thereto. Thus, reaction insert 62 is carried by diaphragm 48 and is vertically displaceable (as viewed in FIG. 4) with respect to body portion 12. Cavity 46 is thus sealed with the exception of port 44 and is defined by upper body portion 12, diaphragm 48 and reaction insert 62. When port 44 is placed in fluid communication with a source of a vacuum signal containing "intelligence" i.e. representative of a device operating parameter, the fluid pressure or vacuum level will be impressed upon the upper surface of diaphragm 48 as viewed in FIG. 4. Inasmuch as cavity 22 is maintained at atmospheric pressure, a pressure differential will be generated across diaphragm 48 and the inner portion thereof including reaction insert 62 will be linearly displaced vertically an amount proportional to the incoming fluid pressure signal.

A generally U shaped crank or idler bar 68 is secured within cavity 22 for limited rotational displacement therein. Idler bar 68 is injection molded of thermal plastic or other suitable material. The free ends of idler bar 68 have laterally outwardly extending pivot pins 70 and 72 depending therefrom which reside within pin receiving cavities 74 and 76 defined by and formed at the interface between upper and lower body portions 12 and 14. As can best be seen in FIG. 3, pins 70 and 72 support idler bar 68 from any but rotational displacement with respect to body 11 and define an axis of rotation which passes there through.

Two barrel shaped bosses 78 and 80 are integrally formed in idler bar 68 at points concentric with the reaction inserts (62) of vacuum motors 32, 34 and 36. Boss 78 defines a reaction insert receiving bore 82. Reaction insert 62 (in FIG. 4) extends downwardly into bore 82 and is retained therein by a cotter pin 84 which passes radially through aligned apertures 86 and 88 in boss 78 and reaction insert 62, respectively. After installation, cotter pin 84 is deformed or otherwise secured in its illustrated position. It is also contemplated that any number of other equivalent structures can be substituted to perform the same function.

The outer diameter of reaction insert 62 is lesser than the inner diameter of bore 82 to provide compensation for slight angular misalignment between the two which will naturally occur during rotational excursions of idler bar 68. The direct mechanical length between reaction insert 62 and idler bar 68 will cause a mechanical reaction force to be applied to idler bar 68 corresponding with fluid pressure signals received at port 44. Vacuum motors 34 and 36 likewise have ports 90 and 92, respectively, which in application, receive additional fluid pressure input signals from independent sources and convert those into mechanical reaction forces which are applied to idler bar 68.

As can best be seen in FIG. 3, the reaction forces applied by reaction insert 62 of vacuum motor 32 as well as reaction inserts 94 and 96 of vacuum motors 34 and 36, respectively, are applied to idler bar 68 at point radially offset from the axis of rotation. The net moment applied to idler bar 68 is then mechanically linked to vacuum modulator valve 38, as will be described in detail herein below, which represents the algebraic sum of the fluid pressure input signals. Although each of the reaction inserts 62, 94 and 96 apply resulting input forces to idler bar 68 at points equidistant from the axis of rotation, it is contemplated that they could be mechanically factored by being disposed closer to or further away from the axis of rotation with respect to one another.

Vacuum modulator valve 38 is of conventional design and has its structure and general operation described in detail in U.S. Pat. No. 3,770,195, U.S. application Ser. No. 088,806 filed Oct. 29, 1979 and U.S. application Ser. No. 146,903, filed May 4, 1980. For the sake of brevity, the portions of these applications relating to the description of operation and structure relevant to vacuum modulator valve 38 is hereby incorporated by reference. However, for the sake of completeness, the general structure of vacuum modulator valve 38 is recited hereinbelow. Nipples 38*a* and 38*b* are integrally formed in lower body portion 14 and define fluid pressure signal outlet port 98 and fluid pressure source inlet port 100, respectively. In application, port 98 would be placed in fluid communication with a controlled device such as diesel EGR valve. Port 100 would be connected to a source of fluid pressure or vacuum such as the intake manifold of a automobile engine.

Port 98 communicates with a fluid chamber 102 through an intermediate passageway 104. Chamber 102 is closed by a flexible rubber diaphragm 106 having (radially) outer and inner peripheral beads 108 and 110, respectively. Outer peripheral bead 108 sealingly resides within an annular groove 112 integrally formed within lower body portion 14 circumscribing chamber 102. Likewise, bead 110 sealing resides within an annular groove 116 formed into a vent insert 118. Insert 118 is directly mechanically linked to boss 80 by a cotter pin 120 in a manner similar to that described in the detailed description of vacuum motor 32.

A vent passageway 122 is formed through insert 118 and a tapered first valve seat 124 is integrally formed adjacent the lower end (as viewed in FIG. 4) thereof. A filter element 126 is disposed within vent passageway 122 to prevent contaminates from entering fluid chamber 102.

Port 100 is in fluid communication with fluid chamber 102 through an interconnecting fluid passageway 128 which passes upwardly through a boss 114 emerging within chamber 102. Passageway 128 has a tapered surface near its upper end defining a second valve seat 130.

An elongated valve member 132 extends upwardly into vent passageway 122 and downwardly into fluid passageway 128, traversing cavity 46. Valve member 132 has upper and lower enlarged end portions which define first and second valve surfaces 134 and 136, respectively. In the position as shown in FIG. 4, both first and second valve surfaces 134 and 136, respectively, of valve member 132 are in sealing engagement with their respective seats 124 and 130, thus placing vacuum modulator valve 38 in the neutral position wherein fluid chamber 102 is isolated from atmospheric air (in cavity 22) and the vacuum source (not illustrated) connected to the fluid pressure inlet port 100. As is best seen in FIG. 3, a plurality of radially extending grooves 138 are formed on the upper surface of boss 114 and function to permit atmospheric vent flow into fluid chamber 102 when the lower most surface of insert 118 (as viewed in FIG. 4) abuts the top surface of boss 114.

A lower retaining plate 140 overlays bead 108 of diaphragm 106 as well as the adjoining portion of lower body portion 14 which defines annular groove 112 to secure diaphragm 106 in its illustrated position. Plate 140 has a large central aperture 142 which permits the unobstructed through passage of insert 118. An upper retaining plate 144 has a plurality of downwardly extending tabs 146 which, in assembly, extend into four circumferentially spaced slots 148 (as best seen in FIG. 3) formed in lower body portion 14. Plate 144 is secured to lower body portion 14 by crimping of the tabs over an appropriate ridge 150 formed in body portion 14. The compressive load exerted by the crimped connection of tabs 146 on ridge 150 maintains plate 140 in sealing engagement with bead 108. Plate 144 has a large center aperture 152 which allows unobstructed through travel of insert 118 and boss 80. Also, retaining clip 56, likewise has a large central aperture 154 which allows the unobstructed through travel of reaction insert 62 and boss 78.

As best seen in FIG. 4, a disc-shaped spring 156 is supported around its periphery between retaining plates 140 and 144 and secured therebetween by tabs 146 which are crimped over ridge 150. A central opening 158 is formed in spring 156 to permit the upper end of vent insert 118 to extend therethrough. Arcuate slots (not illustrated) are stamped into spring 156 for achieving a spring rate suitable for stabilizing and centering movement of insert 118.

To clearly illustrate the internal details of VSI 10, FIGS. 3 and 4 are shown generally with body 11 in true cross-section and with the internal parts in full or partial relief. Additionally, in FIG. 3 the structural details of lower body portion 14 which partially defines vacuum motor 36 and vacuum modulator valve 38 are illustrated. Thus, diaphragm 106, vent insert 118, valve member 132, lower retaining plate 140, upper retaining plate 144, filter element 126 and spring 156 are illustrated as having been removed in FIG. 3, principally to show the structural details of fluid chamber 102, boss 114 and fluid passageway 128. Likewise, the diaphragm and retaining clip associated with vacuum motor 36 (illustrated in FIG. 4) have been removed in FIG. 3.

Calibration screw 40 extends into cavity 22 and terminates defining a circumferential slot 160 therein. One end 162 of a biasing spring 164 loosely nestingly resides within slot 160 whereby spring 164 is restricted from vertical displacement (as viewed in FIG. 4) by calibration screw 40 but does not rotate therewith. The other end 166 of spring 164 embracingly resides within a circumferential slot 168 defined by a boss 170 integrally formed and depending from idler bar 68. The structural details of boss 170 and a typical cross-section of idler bar 68 are shown in FIG. 3*a* which has been rotated 90° clockwise to assume its normal orientation. Manual rotation of calibration screw 40 will act to selectively rotationally position idler bar 68 as well as the inserts of the vacuum motors 32, 34 and 36 and vacuum modulator valve 38 mechanically linked thereto. Spring 164 however, is sized small enough to allow its biasing effect to be overridden by one or more resulting forces being applied upon idler bar 68 from one of the vacuum motors.

Figure 5A:
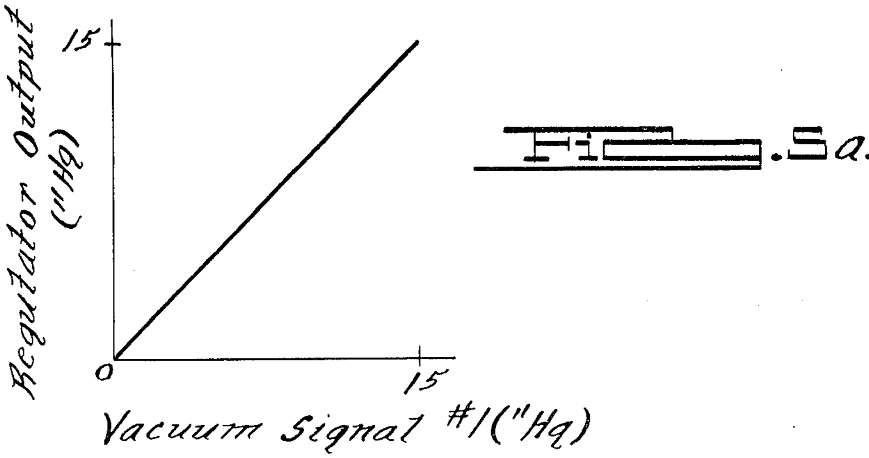
Figure 5B:
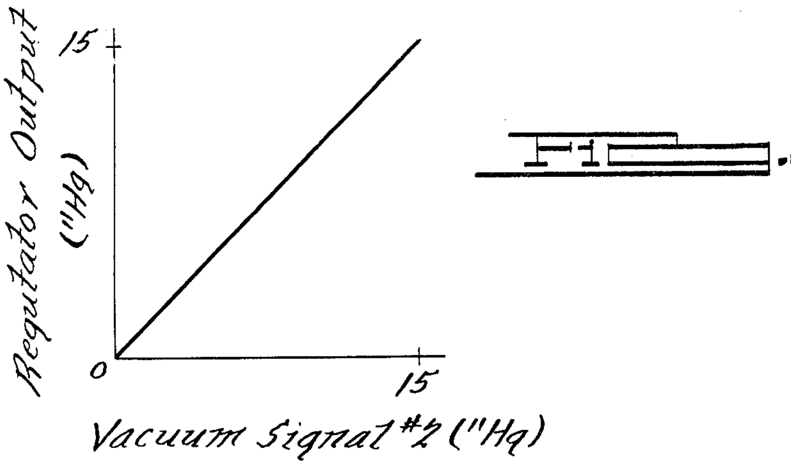
Figure 5C:
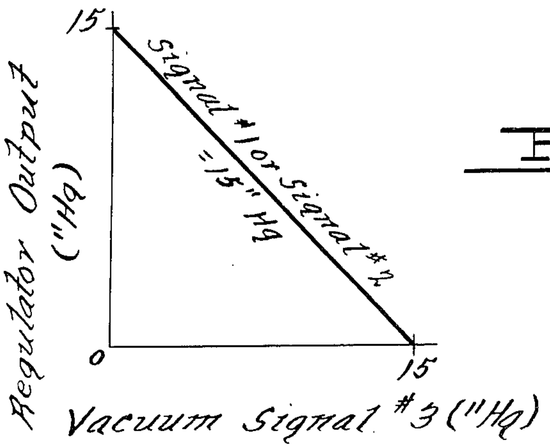

Overall operation of VSI 10 is best understood by reference to FIGS. 5*a* through 5*c* which illustrate typical operating characteristics of VSI 10. For purposes of the cited example, vacuum signals 1, 2 and 3 are applied to vacuum motors 32, 34 and 36, respectively.

It is to be understood that the invention has been described with reference to a specific embodiment which provides the features and advantages previously described, and that such specific embodiment is susceptible to modification, as will be apparent to those skilled in the art. For example, fewer or lesser functions could be incorporated by adding or reducing the number of vaccum motors. Also, it is contemplated that individual calibration of the vacuum motors could be achieved within VSI 10 by inclusion of mechanisms which would effectively permit manipulation of the vertical length of the reaction inserts or vent insert. Accordingly, the foregoing is not to be construed in a limiting sense.

What is claimed is:

1. A device for integrating a plurality of fluid pressure input signals comprising:

(a) housing means defining a plurality of spaced fluid pressure ports each adapted to receive a fluid pressure input signal;

(b) a plurality of pressure responsive means each disposed to receive fluid pressure from one of said ports, and to provide a mechanical force output in response to said pressure signal;

(c) idler means mounted for pivotal movement with respect to said housing means and operative to receive said mechanical forces and to provide in response thereto a single resultant output force;

(d) modulator valve means operative, upon connection to a source of fluid pressure, to provide a modulated output pressure signal in response to force biasing by said single resultant force;

(e) said housing means comprises an upper and lower shell joined for opening and closing on a parting line, wherein said modulator valve means is mounted on one of said upper and lower shell and certain of said pressure responsive means are mounted on the other of said upper and lower shell; and, (f) means for latching said upper and lower shell closed on said parting line.

2. The device defined in claim 1, further comprising releasable means connecting each of said pressure responsive means and said modulator valve means to said idler means for transmission of said forces.

3. The device defined in claim 1, wherein said upper and lower housing means are formed of plastic material.

4. The device defined in claim 1, wherein said upper and lower housing shell are formed of plastic material and said latching means comprises integrally formed snap-locking surfaces.

5. The device defined in claim 1, wherein certain other of said pressure responsive means are disposed on said one shell in spaced relationship with said modulator valve means.

6. The device defined in claim 1, wherein said idler means comprises a generally "U" shaped member having the ends thereof pivotally mounted to opposite sides of said one shell.

7. The device defined in claim 1, wherein valve means includes a fluid pressure signal chamber and said pressure responsive means includes a flexible diaphragm having a vent port movable therewith and a stationary fluid pressure port with a valve member movable with respect to said vent port and said pressure port.

8. The device defined in claim 1, wherein said pressure responsive means includes a flexible diaphragm having a member attached thereto for movement therewith, and means for releasably connecting said member to said idler means for transmitting said resultant force bias to said valve means.

9. The device defined in claim 1, wherein at least one of said pressure responsive members applies its associated mechanical force upon said idler means in a rotational sense opposite the remaining pressure responsive means.

10. The device defined in claim 1, further comprising means operative to apply a preload to said idler means.

11. The device defined in claim 1, further comprising means operative to apply a bias to said idler means providing increased resistance in proportion to increased displacement of said idler means.

12. The device defined in claim 1, wherein said idler means and said modulator valve means are mounted on a common one of said upper and lower shell.

13. The device defined in claim 1 wherein said modulator valve means and said pressure responsive means are releasably connected to said idler means for transmitting said forces.

* * * * *